(12) United States Patent
Chen et al.

(10) Patent No.: US 10,198,613 B2
(45) Date of Patent: Feb. 5, 2019

(54) LATENT FINGERPRINT PATTERN ESTIMATION

(71) Applicant: MorphoTrak, LLC, Anaheim, CA (US)

(72) Inventors: Hui Chen, Foothill Ranch, CA (US); Peter Zhen-Ping Lo, Mission Viejo, CA (US)

(73) Assignee: MorphoTrak, LLC, Anaheim, CA (US)

( * ) Notice: Subject to any disclaimer, the term of this patent is extended or adjusted under 35 U.S.C. 154(b) by 218 days.

(21) Appl. No.: 15/260,862

(22) Filed: Sep. 9, 2016

(65) Prior Publication Data

US 2018/0075272 A1  Mar. 15, 2018

(51) Int. Cl.
    *G06K 9/00*  (2006.01)
    *G06K 9/62*  (2006.01)

(52) U.S. Cl.
    CPC ....... *G06K 9/0008* (2013.01); *G06K 9/00013* (2013.01); *G06K 9/6267* (2013.01)

(58) Field of Classification Search
    CPC .. G06K 9/00087; G06K 9/00; G06K 9/00006; G06K 9/0008; G06K 9/00067; G06K 9/001; G06K 9/00114; G06K 9/6232; G06K 9/6269; G06K 9/00073
    See application file for complete search history.

(56) References Cited

U.S. PATENT DOCUMENTS

| | | | | |
|---|---|---|---|---|
| 2006/0104484 | A1* | 5/2006 | Bolle | G06K 9/00073 382/115 |
| 2010/0128936 | A1* | 5/2010 | Baughman | G06K 9/00885 382/116 |
| 2011/0022847 | A1* | 1/2011 | Duffy | G06K 9/00087 713/179 |
| 2011/0216948 | A1* | 9/2011 | Yalla | G06K 9/00006 382/125 |
| 2011/0262013 | A1* | 10/2011 | Rahmes | G06K 9/00067 382/125 |
| 2015/0278574 | A1* | 10/2015 | Boshra | G06K 9/0008 382/125 |

(Continued)

OTHER PUBLICATIONS

Wang et al., "Enhanced gradient-based algorithm for the estimation of fingerprint orientation fields", Applied Mathematics and Computation, vol. 185, pp. 823-833, 2007.

(Continued)

*Primary Examiner* — Vu Le
*Assistant Examiner* — Guillermo M Rivera-Martinez
(74) *Attorney, Agent, or Firm* — Fish & Richardson P.C.

(57) ABSTRACT

Systems and methods may be used by an automatic fingerprint identification system to estimate patterns of a latent fingerprint. A latent fingerprint image, and a plurality of reference ridge flow maps may initially be obtained. Each reference ridge flow map may be associated with a particular fingerprint pattern. A latent ridge flow map for the obtained latent fingerprint image may be computed. One or more characteristics associated with the latent ridge flow map may be compared to one or more characteristics associated with each of the plurality of reference ridge flow maps. A similarity score between the latent ridge flow map and a (Continued)

particular reference ridge flow map may be computed for each of the plurality of reference ridge flow maps. One or more fingerprint patterns present within the latent fingerprint may then be determined and provided for output.

17 Claims, 7 Drawing Sheets

(56) References Cited

U.S. PATENT DOCUMENTS

2016/0140381 A1* 5/2016 Weiner .............. G06K 9/00087
                                              382/124
2016/0321496 A1* 11/2016 Mather .................... G06T 7/11

OTHER PUBLICATIONS

J. Zhou and J. Gu, "A model-based method for the computation of fingerprints orientation field", IEEE Transactions on Image Process, vol. 13, pp. 821-835, 2004.

K. Kam and A. Jain "Fingerprint classification" Pattern Recognition, vol. 29, No. 3 pp. 389-404, 1996.

Cappelli et al., "Fingerprint classification by directional Image Partitioning", IEEE Transactions on Pattern Analysis and Machine Intelligence, vol. 21 No. 5, pp. 402-421, May 1999.

Park et al., "Singular point detection by shape analysis of directional fields in fingerprints", Pattern Recognition, vol. 39, No. 5, pp. 839-855, 2006.

K. Nilsson and J.Bigun, "Localization of Corresponding points in Fingerprints by complex filtering", Pattern Recognition Letters, vol. 24, No. 13, pp. 1-11, 2003.

Liu et al., "Fingerprint registration by maximization of mutual information", IEEE Transactions on Image Processing, vol. 15, No. 5, pp. 1100-1110, 2006.

N. Yager and A. Amin, "Coarse Fingerprint Registration Using Orientation Fields," EURASIP Journal on Applied Signal Processing, 2005:13, 2043-2053.

* cited by examiner

LATENT FINGERPRINT PATTERN ESTIMATION

FIELD

The present disclosure relates generally to fingerprint identification systems.

BACKGROUND

Pattern matching systems such as ten-print or fingerprint matching systems play a critical role in criminal and civil applications. For example, fingerprint identification is often used for identify and track suspects and in criminal investigations. Similarly, fingerprint verification is used in in civil applications to prevent fraud and support other security processes.

SUMMARY

Latent fingerprint images are often captured on different surfaces in various lighting conditions, reducing their overall quality. In many instances, such latent fingerprint images are only partially captured on the surface, reducing the fingerprint region to be analyzed by an automatic fingerprint identification system (AFIS). Modern AFIS systems often perform poorly when analyzing low quality latent fingerprint images because of distortions, different types of noise backgrounds and/or partial images limiting feature extraction for identification and matching.

AFIS often compare a latent fingerprint image against ten-print images stored within a reference database to identify a potential match within the reference database. One common technique is to classify a latent fingerprint image by the particular fingerprint patterns (e.g., whorl, left loop, right loop, arch) that are included within the latent image, and then comparing against other reference images that also include the particular fingerprint patterns. However, fingerprint patterns are difficult to accurately predict for partial latent fingerprint images because they often lack regions that include distinctive features. Although some automatic pattern classification techniques have been proposed for partial latent fingerprint images, such techniques are often inaccurate, or provide limited advantages over manual classification, which is often susceptible to significant error as well. Thus, the automatic pattern classification techniques are not used in an operational AFIS.

In general, one innovative aspect described throughout this disclosure includes accurately estimating fingerprint patterns present within a partial, different types of noise backgrounds and/or distorted latent fingerprint image so that the accuracy of the latent to ten-print search will not be sacrificed. The estimated fingerprint patterns can then be used for automatic fingerprint exclusion processing to reduce the number of reference ten-print images to be compared for an effective fingerprint identification operation or reduce the number of candidates for verification by latent examiners. For instance, an AFIS may initially generate a latent ridge flow map for the latent fingerprint image. The latent ridge flow map may then be compared against a set of reference ridge flow maps that are predetermined to be associated with a particular fingerprint pattern. Respective similarity scores may be computed between the latent ridge flow map and each of the reference ridge flow maps in order to identify the best-matched reference ridge flow maps. The system may then use two exemplary types of techniques to estimate fingerprint patterns present within the latent fingerprint image.

In some implementations, the system may generate feature vector for the reference ridge flow maps, and estimate the fingerprint patterns present within the latent fingerprint image using a trained classifier that is capable of identifying feature similarities for each type of fingerprint pattern. Alternatively, in other implementations, the system generates a set of class labels for each type of fingerprint pattern, and then computes a set of respective aggregate probabilities indicating a likelihood that the particular fingerprint pattern corresponding to the class pattern is included within latent fingerprint image. The respective aggregate probabilities may be computed based on the features associated with the best-matched reference ridge flow maps and/or the fingerprint patterns associated with the best-matched reference ridge flow maps. The system then assigns particular class models to the latent fingerprint image based on the values associated with the respective aggregate probabilities for each of the class labels.

Implementations may include one or more of the following features. For example, a method for estimating patterns of a latent fingerprint may be implemented by an automatic fingerprint identification system including a processor, a memory coupled to the processor, an interface to a fingerprint scanning device, and a sensor associated with the fingerprint scanning device. The method may include: obtaining (i) a latent fingerprint image, and (ii) a plurality of reference ridge flow maps that are each associated with a particular fingerprint pattern; computing a latent ridge flow map for the obtained latent fingerprint image; comparing one or more characteristics associated with the latent ridge flow map to one or more corresponding characteristics associated with each of the plurality of reference ridge flow maps; computing, for each of the plurality of reference ridge flow maps, a similarity score between the latent ridge flow map and a particular reference ridge flow map based at least on comparing the one or more characteristics associated with the latent ridge flow map to the one or more corresponding characteristics associated with each of the plurality of reference ridge flow maps; estimating one or more fingerprint patterns present within the latent fingerprint image; and providing the estimated one or more fingerprint patterns present within the latent fingerprint image for output.

Other versions include corresponding systems, and computer programs, configured to perform the actions of the methods encoded on computer storage devices.

One or more implementations may include the following optional features. For example, in some implementations, estimating one or more fingerprint patterns present within the latent fingerprint image includes: generating a feature vector that includes features associated with the plurality of reference ridge flow maps; inputting the generated feature vector into a trained classifier; and estimating one or more one or more fingerprint patterns present within the latent fingerprint image based at least on features associated with the plurality of reference ridge flow maps that are identified by the trained classifier.

In some implementations, the predetermined threshold value is empirically determined based on processing one or more addition reference ridge flow maps that are not included within the plurality of reference ridge flow maps.

In some implementations, estimating one or more fingerprint patterns present within the latent fingerprint image includes: identifying a subset of the plurality of reference ridge flow maps that each have a respective computed similarity score greater than a predetermined threshold value; obtaining class labels for each particular fingerprint pattern; computing respective aggregate probabilities for each of the generated class labels that represent a likelihood that the latent fingerprint image includes the particular fingerprint pattern corresponding to each class label; and estimating one or more one or more fingerprint patterns present within the latent fingerprint image based at least on the computed respective aggregate probabilities for each of the corresponding class labels.

In some implementations, obtaining a plurality of reference ridge flow maps includes: obtaining a plurality of reference fingerprint images that are each associated with a respective fingerprint pattern, wherein at least some of the plurality of reference fingerprint images are associated with a different respective fingerprint pattern; computing a reference ridge flow map for each of the plurality of reference fingerprint images; selecting a set of representative reference ridge flow maps for each respective fingerprint pattern; and storing, as the plurality of reference ridge flow maps, (i) the set of representative ridge flow maps for each respective fingerprint pattern, and (ii) the corresponding respective fingerprint patterns for each representative ridge flow map among the representative ridge flow maps.

In some implementations, the method further includes: obtaining a plurality of high quality fingerprint images as a plurality of reference fingerprint images, wherein each of the plurality of high quality fingerprint images includes (i) a high ridge contrast, (ii) includes a full fingerprint, and (iii) includes all possible fingerprint patterns; and manually labeling each of the plurality of reference fingerprint images with a particular fingerprint pattern.

In some implementations, selecting a set of representative reference ridge flow maps for each fingerprint pattern includes selecting the set of representative reference ridge flow maps using at least one of the following techniques: (i) K-means clustering technique, (ii) agglomerative clustering technique, or (iii) an unsupervised learning technique.

In some implementations, generating a feature vector includes: aligning the latent ridge flow map with each of the plurality of reference maps; comparing each block of the aligned maps between the latent and each of reference maps; calculating the similarity scores for each latent ridge flow map to the plurality of reference maps; and generating the feature vector based on the similarity scores of the latent ridge flow map to the plurality of reference maps.

In some implementations, aligning the latent ridge flow map with each of the plurality of reference ridge flow maps includes using at least one of the following techniques: a maximization of mutual information technique; a generalized Hough transformation technique; use of core, delta or distinctive pattern-based technique; or a gradient decent method with a cost function technique.

In some implementations, the feature vector is obtained by dimensional reduction using a principal component analysis technique.

In some implementations, the classifier is trained from a plurality of feature vectors that are generated based at least on (i) the plurality of similarity scores computed by matching a plurality of latent ridge flow maps to the reference ridge flow maps, and (ii) a set of manually marked patterns of the plurality of the latent ridge flow maps.

In some implementations, the plurality of latent ridge maps is generated from a set of simulated latent images.

In some implementations, the plurality of latent ridge flow maps are generated from the set of simulated latent images using a derivation technique from a plurality of real fingerprint images with different image qualities, the derivation technique including: extracting the ridge flow map from each of the plurality of real fingerprint images with different image qualities; randomly selecting one or more partial ridge flow maps from among the extracted ridge flow maps from each of the plurality of real fingerprint images with different image qualities; and manually assigning a plurality of fingerprint patterns consisting of a whorl, a left loop, a right loop, an arch, or combination thereof, to each of the randomly selected one or more partial ridge flow map of the fingerprint image.

In some implementations, the classifier includes at least one of the following: a Random Forest classifier; a support vector machine; a neural network; or a traditional pattern classifier.

In some implementations, the method further includes: after determining the one or more fingerprint patterns present within the latent fingerprint image, obtaining a pre-enrolled reference dataset comprising a plurality of ten-print images, each ten-print image associated with a particular fingerprint pattern; comparing the one or more fingerprint patterns present within the latent fingerprint image to the fingerprint patterns associated with each of the ten-print images; identifying a subset of the plurality of ten-print images that are associated with fingerprint patterns that are not included within the one or more fingerprint patterns present within the latent fingerprint image; and excluding the subset of the plurality of ten-print images from a subsequent pre-enrolled reference dataset used to compare against the latent fingerprint image for a fingerprint matching operation.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, one innovative aspect described throughout this disclosure includes accurately estimating fingerprint patterns present within a partial, different types of noise backgrounds and/or distorted latent fingerprint image. The estimated fingerprint patterns can then be used for automatic fingerprint exclusion processing to reduce the number of reference ten-print images to be compared for an effective fingerprint identification operation or reduce the number of candidates for verification by latent examiners. For instance, an automatic fingerprint identification system (AFIS) may initially generate a latent ridge flow map for the latent fingerprint image. The latent ridge flow map may then be compared against a set of reference ridge flow maps that are predetermined to be associated with a particular fingerprint pattern. Respective similarity scores may be computed between the latent ridge flow map and each of the reference ridge flow maps in order to identify the best-matched reference ridge flow maps. The system may then use two exemplary types of techniques to estimate fingerprint patterns present within the latent fingerprint image.

In some implementations, the system may generate feature vector for the reference ridge flow maps, and estimate the fingerprint patterns present within the latent fingerprint image using a trained classifier that is capable of identifying feature similarities for each type of fingerprint pattern. Alternatively, in other implementations, the system generates a set of class labels for each type of fingerprint pattern, and then computes a set of respective aggregate probabilities indicating a likelihood that the particular fingerprint pattern corresponding to the class pattern is included within latent fingerprint image. The respective aggregate probabilities may be computed based on the features associated with the best-matched reference ridge flow maps and/or the fingerprint patterns associated with the best-matched reference ridge flow maps. The system then assigns particular class models to the latent fingerprint image based on the values associated with the respective aggregate probabilities for each of the class labels.

System Architecture

Figure 1A:
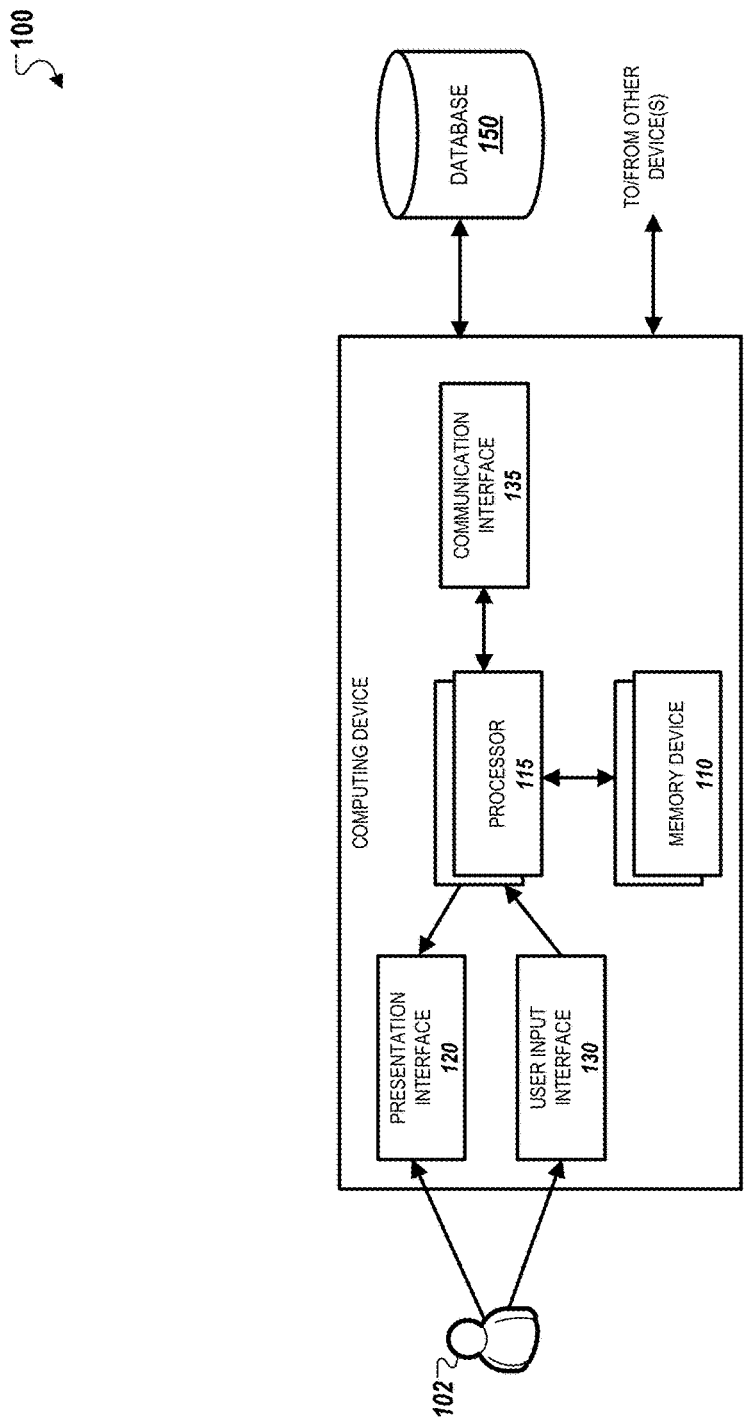
FIG. 1A illustrates a block diagram of an exemplary automatic fingerprint identification system.

FIG. 1 is a block diagram of an exemplary automatic fingerprint identification system (AFIS) 100. Briefly, the AFIS 100 may include a computing device including a memory device 110, a processor 115, a presentation interface 120, a user input interface 130, and a communication interface 135. The AFIS 100 may be configured to facilitate and implement the methods described through this specification. In addition, the AFIS 100 may incorporate any suitable computer architecture that enables operations of the system described throughout this specification.

The processor 115 may be operatively coupled to memory device 110 for executing instructions. In some implementations, executable instructions are stored in the memory device 110. For instance, the AFIS 100 may be configurable to perform one or more operations described by programming the processor 115. For example, the processor 115 may be programmed by encoding an operation as one or more executable instructions and providing the executable instructions in the memory device 110. The processor 115 may include one or more processing units, e.g., without limitation, in a multi-core configuration.

The memory device 110 may be one or more devices that enable storage and retrieval of information such as executable instructions and/or other data. The memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

The memory device 110 may be configured to store a variety of data including, for example, matching algorithms, scoring algorithms, scoring thresholds, perturbation algorithms, fusion algorithms, virtual minutiae generation algorithms, minutiae overlap analysis algorithms, and/or virtual minutiae analysis algorithms. In addition, the memory device 110 may be configured to store any suitable data to facilitate the methods described throughout this specification.

The presentation interface 120 may be coupled to processor 115. For instance, the presentation interface 120 may present information, such as a user interface showing data related to fingerprint matching, to a user 102. For example, the presentation interface 120 may include a display adapter (not shown) that may be coupled to a display device (not shown), such as a cathode ray tube (CRT), a liquid crystal display (LCD), an organic LED (OLED) display, and/or a hand-held device with a display. In some implementations, the presentation interface 120 includes one or more display devices. In addition, or alternatively, the presentation interface 120 may include an audio output device (not shown), e.g., an audio adapter and/or a speaker.

The user input interface 130 may be coupled to the processor 115 and receives input from the user 102. The user input interface 130 may include, for example, a keyboard, a pointing device, a mouse, a stylus, and/or a touch sensitive panel, e.g., a touch pad or a touch screen. A single component, such as a touch screen, may function as both a display device of the presentation interface 120 and the user input interface 130.

In some implementations, the user input interface 130 may represent a fingerprint scanning device that is used to capture and record fingerprints associated with a subject (e.g., a human individual) from a physical scan of a finger, or alternately, from a scan of a latent print. In addition, the user input interface 130 may be used to create a plurality of reference records.

A communication interface 135 may be coupled to the processor 115 and configured to be coupled in communication with one or more other devices such as, for example, another computing system (not shown), scanners, cameras, and other devices that may be used to provide biometric information such as fingerprints to the AFIS 100. Such biometric systems and devices may be used to scan previously captured fingerprints or other image data or to capture live fingerprints from subjects. The communication interface 135 may include, for example, a wired network adapter, a wireless network adapter, a mobile telecommunications adapter, a serial communication adapter, and/or a parallel communication adapter. The communication interface 135 may receive data from and/or transmit data to one or more remote devices. The communication interface 135 may be also be web-enabled for remote communications, for example, with a remote desktop computer (not shown).

The presentation interface 120 and/or the communication interface 135 may both be capable of providing information suitable for use with the methods described throughout this specification, e.g., to the user 102 or to another device. In this regard, the presentation interface 120 and the communication interface 135 may be used to as output devices. In other instances, the user input interface 130 and the communication interface 135 may be capable of receiving information suitable for use with the methods described throughout this specification, and may be used as input devices.

The processor 115 and/or the memory device 110 may also be operatively coupled to the database 150. The database 150 may be any computer-operated hardware suitable for storing and/or retrieving data, such as, for example, pre-processed fingerprints, processed fingerprints, normalized fingerprints, extracted features, extracted and processed feature vectors such as octant feature vectors (OFVs), threshold values, virtual minutiae lists, minutiae lists, matching algorithms, scoring algorithms, scoring thresholds, perturbation algorithms, fusion algorithms, virtual minutiae generation algorithms, minutiae overlap analysis algorithms, and virtual minutiae analysis algorithms.

The database 150 may be integrated into the AFIS 100. For example, the AFIS 100 may include one or more hard disk drives that represent the database 150. In addition, for example, the database 150 may include multiple storage units such as hard disks and/or solid state disks in a redundant array of inexpensive disks (RAID) configuration. In some instances, the database 150 may include a storage area network (SAN), a network attached storage (NAS) system, and/or cloud-based storage. Alternatively, the database 150 may be external to the AFIS 100 and may be accessed by a storage interface (not shown). For instance, the database 150 may be used to store various versions of reference records including associated minutiae, octant feature vectors (OFVs) and associated data related to reference records.

Fingerprint Identification and Matching

In general, the AFIS 100 may perform fingerprint identification and matching in two stages: (1) an enrollment stage, and (2) an identification/verification stage.

In the enrollment stage, an individual (or a "registrant") has their fingerprints and personal information enrolled. The registrant may be an individual manually providing their fingerprints for scanning or, alternately, an individual whose fingerprints were obtained by other means. In some examples, registrants may enroll fingerprints using latent prints, libraries of fingerprints, and any other suitable repositories and sources of fingerprints. As described, the process of "enrolling" and other related terms refer to providing biometric information (e.g., fingerprints) to an identification system (e.g., the AFIS 100).

The automatic fingerprint identification 100 system may extract fingerprint patterns from fingerprints. As described herein, "patterns" and related terms refer to characteristic attributes of features that are classified during a fingerprint identification or matching operation. Examples of patterns include whorls, left loops, right loops, and arches. The patterns present within a fingerprint are then used for to classify a latent fingerprint.

In some implementations, the AFIS 100 may contain millions of reference records. As a result, by enrolling a plurality of registrants (and their associated fingerprints and personal information), the AFIS 100 may create and store a library of reference records that may be used for comparison to search records. The library may be stored at the database 150 associated.

In the identification stage, the AFIS 100 may use the extracted features and personal information to generate a record known as a "search record". The search record represents a source fingerprint for which identification is sought. For example, in criminal investigations, a search record may be retrieved from a latent print at a crime scene. The automatic fingerprint identification may compare the search record with the enrolled reference records in the database 150. For example, during a search procedure, a search record may be compared against the reference records stored in the database 150. In such an example, the features of the search record may be compared to the features of each of the plurality of reference records. For instance, minutiae extracted from the search record may be compared to minutiae extracted from each of the plurality of reference records.

As described, a "similarity score" is a measurement of the similarity of the fingerprint features (e.g., minutiae) between the search record and each reference record, represented as a numerical value to degree of similarity. For instance, in some implementations, the values of the similarity score may range from 0.0 to 1.0, where a higher magnitude represents a greater degree of similarity between the search record and the reference record.

The AFIS 100 may compute individual similarity scores for each comparison of features (e.g., minutiae), and aggregate similarity scores (or "final similarity scores") between the search record to each of the plurality of reference records. In this regard, the AFIS 100 may generate similarity scores of varying levels of specificity throughout the matching process of the search record and the plurality of reference records.

The AFIS 100 may also sort each of the individual similarity scores based on the value of the respective similarity scores of individual features. For instance, the automatic identification system 100 may compute individual similarity scores between respective minutiae between the search fingerprint and the reference fingerprint, and sort the individual similarity scores by their respective values.

A higher final similarity score indicates a greater overall similarity between the search record and a reference record while a lower final similarity score indicates a lesser over similarity between the search record and a reference record. Therefore, the match (i.e., the relationship between the search record and a reference record) with the highest final similarity score is the match with the greatest relationship (based on minutiae comparison) between the search record and the reference record.

Pattern Extraction

Figure 1B:
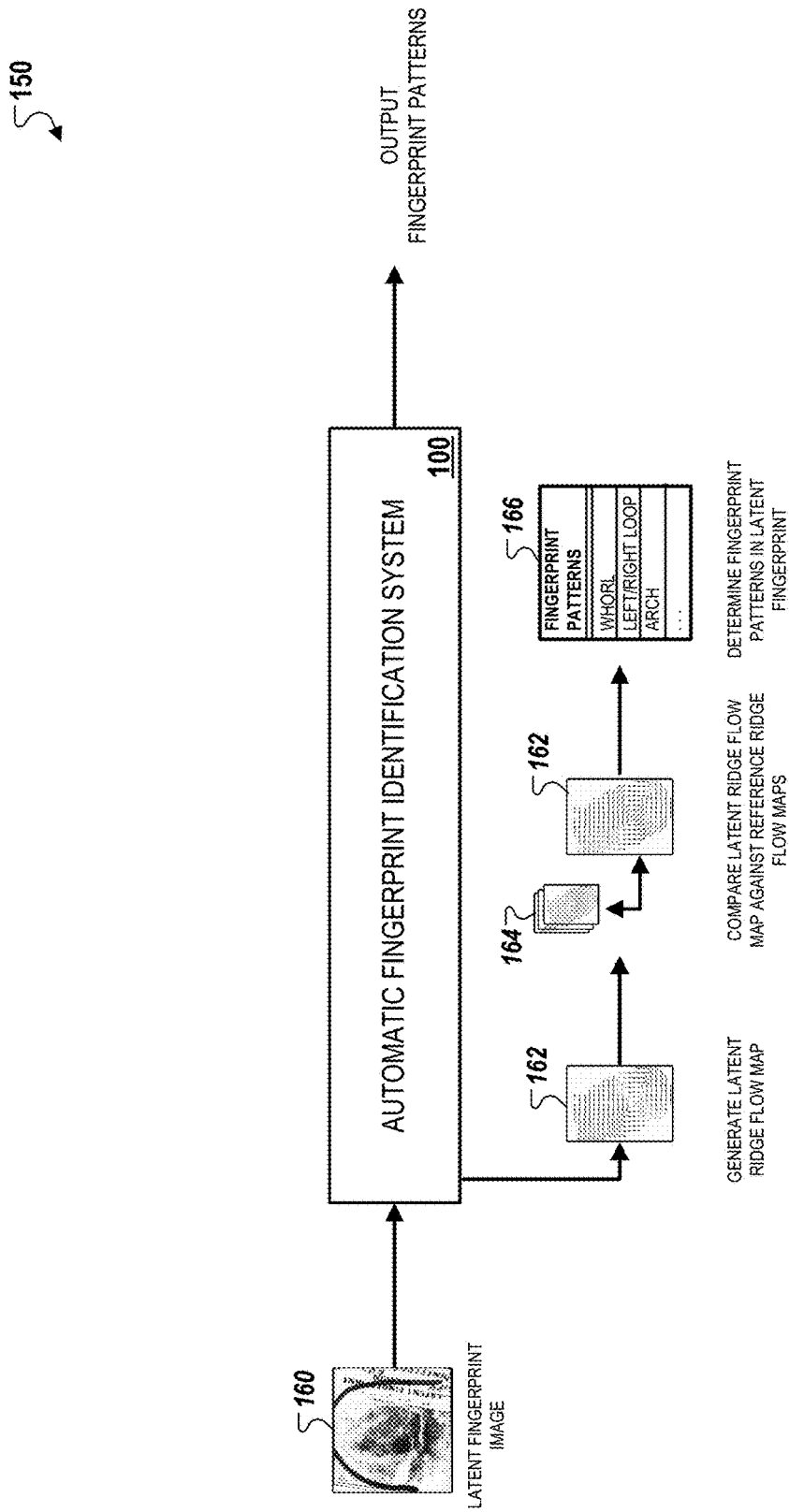
FIG. 1B illustrates a block diagram of an exemplary fingerprint pattern extraction process.

FIG. 1B is a block diagram of an exemplary fingerprint pattern extraction process 150 performed by the AFIS 100. As depicted, the process 150 generally includes three stages: (i) generating a latent ridge flow map 162 for the latent fingerprint image 160, (ii) comparing the latent ridge flow map 162 against a set of reference ridge flow maps 164, and (iii) estimating a set of fingerprint patterns 166 in the latent fingerprint image 160.

The AFIS 100 may initially generate a set of reference ridge flow maps 164 prior to performing the process 150. For instance, the set of reference ridge flow maps 164 may be pre-generated ridged flow maps for a set of selected high quality images that are predetermined to have each type of the fingerprint patterns. More particular descriptions related to generation of the set of reference ridge flow maps 164 are provided with respect to FIG. 2.

During a fingerprint identification operation, the AFIS 100 initially generates a latent ridge flow map 162. The latent ridge flow map 162 provides a directional arrangement of friction ridges present within the latent fingerprint image 160. For instance, the latent ridge flow map 162 includes an arrangement of ridge flow vectors that are tangential to the direction of the friction ridges of the latent fingerprint.

The latent ridge flow map 162 may be estimated using a variety of techniques. For instance, in some implementations, the latent ridge flow map 162 is generated using automated tools to extract the flow directions from the latent fingerprint image 160. In such implementations, the automated markup may be post-processed using a set of image processing techniques to correct inaccuracies in the automated flow map. In other implementations, the latent ridge flow map 162 is estimated using a combination of automated and manual techniques. In such implementations, a latent examiner may manually correct inaccuracies in the automated flow map.

The AFIS 100 then compares attributes associated with the latent ridge flow map 162 with the attributes associated with the set of reference ridge flow maps 164. For instance, the AFIS 100 may measure a correspondence between the latent ridge flow map 162 and each reference ridge flow map from among the set of reference ridge flow maps 164. Such correspondence measurement techniques may include local comparisons of individual ridge flow vectors within particular regions of the latent ridge flow map 162, or global comparisons of sets of ridge flow vectors over the entire area of the latent ridge flow map 162. The AFIS 100 then computes a set of respective similarity scores that reflect degrees of correspondence between the latent ridge flow map 162 and each of the set of reference ridge flow maps 164.

The AFS 100 then uses the computed similarity scores between the latent ridge flow map 162 and each of the set of reference ridge flow maps 164 to filter and select a subset of the set of reference ridge flow maps 164 that are determined to be the most similar to the latent ridge flow map 162. For instance, the AFS 100 may use a threshold similarity score and select only those reference ridge flow maps that have a computed similarity score greater than the threshold similarity score.

The patterns associated with each of the selected subset of the set of reference ridge flow maps 164 are then analyzed and processed to predict a set of fingerprint patterns associated with the latent ridge flow map 162. In some implementations, as described herein with respect to FIGS. 4-5, this is accomplished with the generation of a feature vector for the selected subset of the set of reference ridge flow maps 164, and use of a trained classifier to predict the fingerprint patterns of latent fingerprint image 160 based on the generated feature vector.

Alternatively, in other implementations, this is accomplished by identifying manually verified classifications associated with each of the subset of the set of reference flow maps 164, and then assigning the most probable class labels to the latent fingerprint image 160 based on the classifications associated with particular reference flow maps that are determined to be most similar to the latent ridge flow map 162. More particular descriptions related to each fingerprint pattern estimation technique for the latent fingerprint image 160 are provided below.

Reference Ridge Flow Map Generation

The AFIS 100 generates a set of reference ridge flow maps 164 offline prior to performing a fingerprint pattern estimation operation, as depicted in FIG. 1B, for a latent fingerprint image. As described herein, each individual reference ridge flow map is generated for a predetermined high quality fingerprint image that is manually associated with a particular fingerprint classification (e.g., arch, left loop, right loop, and whorl). In this regard, the number of individual ridge flow maps within the set of reference ridge flow maps 164 is set such that each of the four fingerprint classifications are equally represented within the set, and for each type of fingerprint classification, there are a sufficient number of individual ridge flow maps to cover all fingerprint patterns present within a fingerprint image. The descriptions below provide further detail as to how the set of reference ridge flow maps 164 are generated and stored for use during a subsequent fingerprint identification operation.

Figure 2:
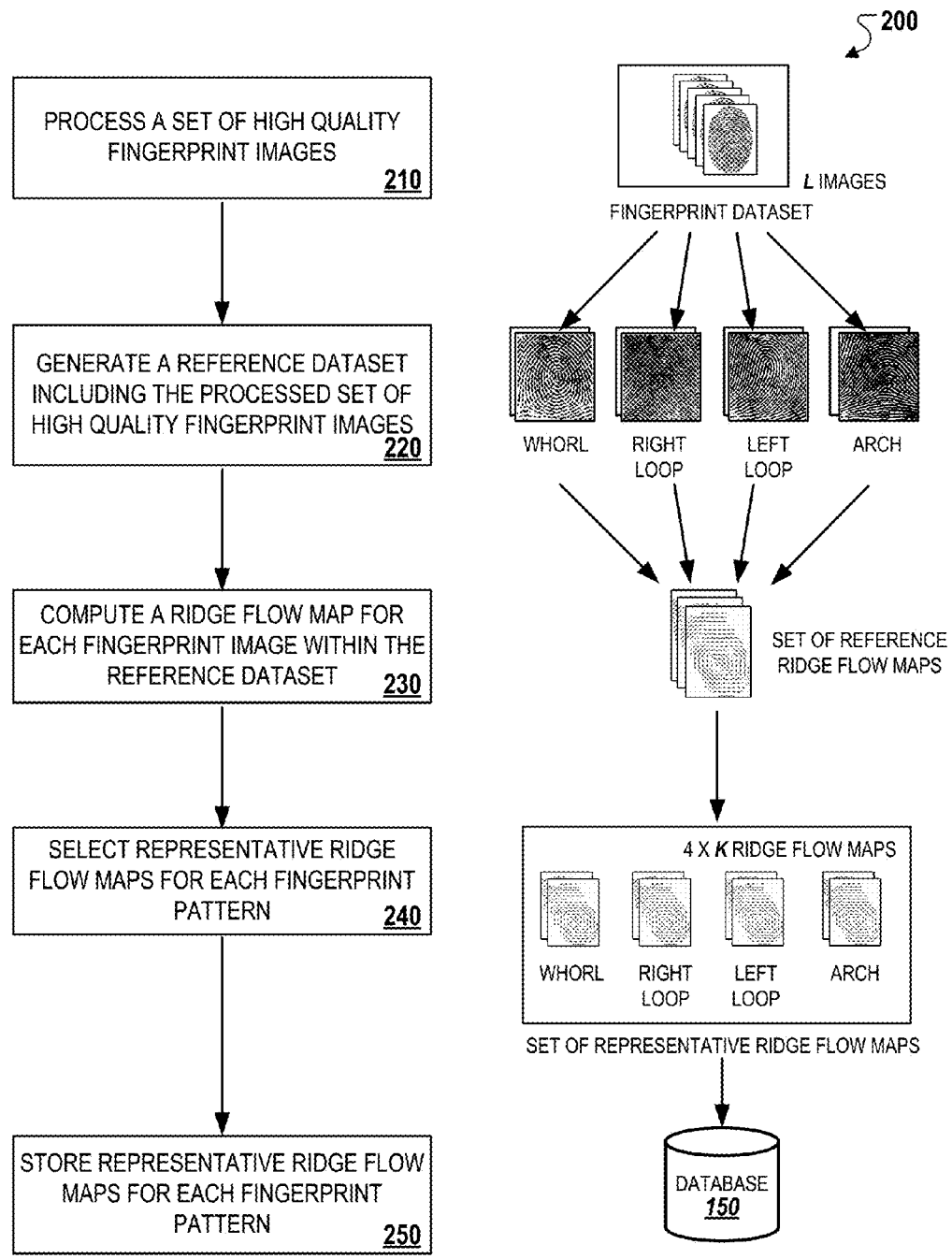
FIG. 2 illustrates an exemplary process for storing a set of representative ridge flow maps for a set of high quality fingerprint images.

FIG. 2 illustrates an exemplary process 200 for storing a set of representative ridge flow maps for a set of high quality fingerprint images. Briefly, the process 200 may include processing a set of high quality fingerprint images (210), generating a reference dataset including the processed set of high quality fingerprint images (220), computing a ridge flow map for each fingerprint image within the reference dataset (230), selecting representative ridge flow maps for each fingerprint pattern (240), and storing representative ridge flow maps for each fingerprint pattern (250).

In more detail, the process 200 may include processing a set of high quality fingerprint images (210). For instance, the AFIS 100 may obtain a set of fingerprint images that have a predetermined set of associated attributes indicating that they are high quality images. Examples of such attributes include having a high ridge contrast, including a full fingerprint (as opposed to a partial fingerprint), and including all possible fingerprint patterns (e.g., whorl, left loop, right loop, arch) within a single image. These images are selected as reference images because processing and analyzing these images to determine the fingerprint patterns included within the images can be performed by the AFIS 100 with a degree of high accuracy (e.g., sufficiently low false positive and/or false negative fingerprint pattern detection).

In some implementations, the AFIS 100 includes a software sub-component that performs a set accuracy tests in order to determine whether a particular fingerprint image should be included within the fingerprint data set including the set of high quality fingerprint images. In such implementations, the sub-component may compute a ridge contrast, determine the number of fingerprint patterns represented within a particular input fingerprint image, and/or determine whether the input fingerprint image includes an entire fingerprint. The sub-component may then compare the determined attributes to a set of predetermined criteria in order to automatically determine whether the input fingerprint image should be labeled as a high quality image to be included within the dataset for processing by the AFIS 100.

The process 200 may include generating a reference dataset including the processed set of high quality fingerprint images (220). For instance, the AFIS 100 may select a set of fingerprint images that have attributes indicating that they are high quality images (e.g., ridge contrast, representing a high portion of an entire fingerprint, large number of fingerprint pattern inclusions). The AFIS 100 may then generate a reference dataset that includes these images to be used in a subsequent fingerprint identification.

The AFIS 100 may also perform a set of verification operations to ensure that the generated reference dataset includes an adequate number of different individual fingerprint images. For instances, the verification operations may include determining that each of the different types of fingerprint patterns are equally represented within the reference dataset, and that the individual fingerprint images for each fingerprint pattern contains enough variant images to cover the entire pattern space associated with each fingerprint pattern.

In some implementations, each fingerprint image may be manually labeled by a latent fingerprint examiner. For example, the latent fingerprint examine may manually identify and label the fingerprint patterns that are present within each individual fingerprint image. The manual labels may then be incorporated into the reference dataset for use by the AFIS 100 during a fingerprint identification operation. Alternatively, in other implementations, each fingerprint image may instead be automatically pre-processed by a pattern classification engine, followed by a manual verification by a latent fingerprint examiner.

The process 200 may include computing a ridge flow map for each fingerprint image within the reference dataset (230). For instance, as described herein with respect to FIG. 1B, the AFIS 100 may compute a right flow map for each individual fingerprint image within the reference dataset.

The process 200 may include selecting representative ridge flow maps for each fingerprint pattern (240). After generating ridge flow maps for each of the individual fingerprint images within the reference dataset, the AFIS 100 then uses a variety of techniques to select representative ridge flow maps for each fingerprint pattern. For example, in some implementations, the AFIS 100 uses a K-means clustering technique to identify particular ridge flow maps that are the most representative ridge flow maps for a particular fingerprint patter. In other implementations, the AFIS 100 is capable of using other types of techniques such as agglomerative clustering or unsupervised learning.

In some implementations, the number of representative ridge flow maps selected by the AFIS 100 may be adjusted based on, for example, the variations between the individual ridge flow maps for each fingerprint pattern, the number of individual ridge flow maps for each fingerprint pattern, and/or accuracy requirements for a particular fingerprint identification operation. In such implementations, the AFIS 100 may either increase or decrease the number of representative ridge flow maps to include within the stored reference dataset.

The process 200 may include storing representative ridge flow maps for each fingerprint pattern (250). After selecting the representative ridge flow maps for each fingerprint pattern, the AFIS 100 then stores the selected representative ridge flow maps as the set of reference ridge flow maps 164 in the database 150.

Classifier Training

As described herein, in some implementations, the AFIS 100 may use trained classifiers to predict a set of fingerprint patterns present within the latent fingerprint image 160 based on comparisons to a set of reference ridge flow maps that include representative ridge flow maps for each type of fingerprint pattern. The descriptions below provide an overview of the techniques used by the AFIS 100 to train these classifiers.

In general, the classifier used by the AFIS 100 may be a type of statistical classifier that predicts a set of categories (e.g., fingerprint patterns) that the latent fingerprint 160 belongs to on the basis of a training set of data containing observations or instances whose category memberships are known. Examples of specific types of classifiers that are capable of being used by the AFIS 100 include a Random Forest classifier, a support vector classifier, a neural network, a traditional pattern classifier, or any other type of decision-based logic that identifies categories based on analyzing attributes associated with an input given known attributes of the training set of data.

The training dataset used to train the classifier may include a large set of synthetic partial latent images if the number of real latent images are small that are randomly selected from a set of full images. The training dataset may include images with different qualities in order to ensure that training enables the classifier to identify patterns present within low quality latent fingerprint images. For instance, the training dataset may include individual fingerprint images with introduced noise to imitate low quality latent fingerprints that are collected in real-world circumstances.

The descriptions below provide an overview of exemplary techniques to train a classifier used to predict fingerprint patterns present within the latent fingerprint image 160. In some implementations, the training procedure may be executed by a software module that is separate component from the AFIS 100 (e.g., an external training system). In other implementations, as described below for simplicity, the training procedure may instead be executed by a software component and/or module that is associated with the AFIS 100 (e.g., a training module).

Figure 3:
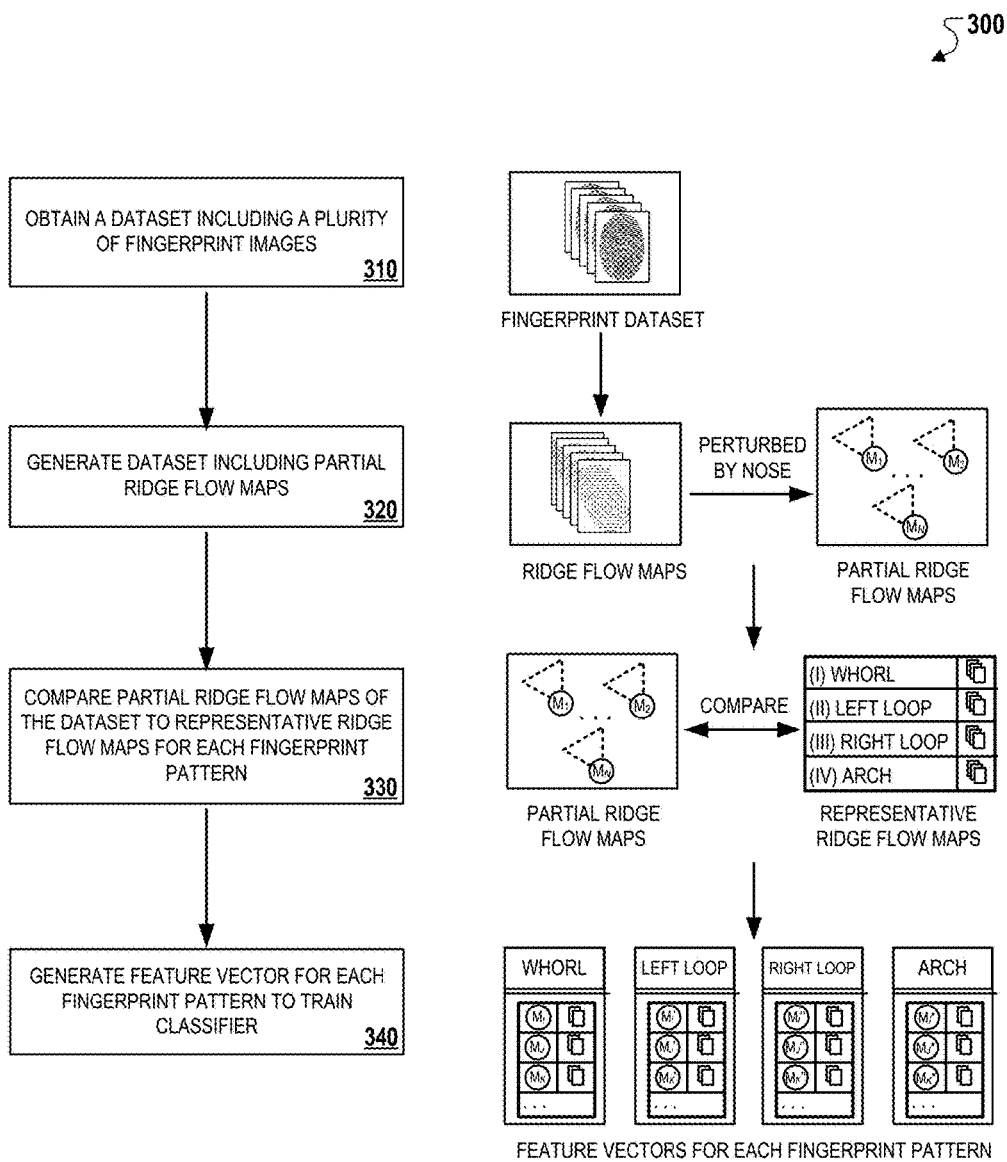
FIG. 3 illustrates an exemplary process for generating feature vectors to train a classifier.

FIG. 3 illustrates an exemplary process 300 for generating feature vectors to train a classifier. Briefly, the process 300 may include obtaining a dataset including a plurality of fingerprint images (310), generating a dataset including partial ridge flow maps (320), comparing partial ridge flow maps of the dataset to representative ridge flow maps for each fingerprint pattern (330), and generating feature vectors for each fingerprint pattern to train classifier (340).

In more detail, the process 300 may include obtaining a dataset including a plurality of fingerprint images (310). For instance, the AFIS 100 may select a type of classifier and a large dataset that includes various fingerprint images of different qualities. As described herein with respect to FIGS. 1B and 2, the number of individual fingerprint images within the dataset and/or the different quality of fingerprint images may be adjusted to improve the training operation.

The process 300 may include generating a dataset including partial ridge flow maps (320). After obtaining the dataset, the AFIS 100 may introduce synthetic noise into the individual images to imitate particular types of noise perturbations that tend to be present within collected latent fingerprint images. For example, the AFIS 100 may incorporate noise that emulates smudges in fingerprint patterns on a collection surface, distortions related to fingerprint collection on an irregular or curved surface, among other types. After introducing noise into the individual fingerprint images, the AFIS 100 then generates ridge flow maps for each individual fingerprint image using techniques described previously with respect to FIGS. 1B and 2. The AFIS 100 also labels each of the ridge flow maps with an associated fingerprint pattern based on the known pattern associated with the corresponding fingerprint image prior to introducing the noise.

After generating the ridge flow maps for the synthetically distorted fingerprint images, the AFIS 100 then randomly selects a particular ridge flow map to compare against the set of representative reference ridge flow maps for each fingerprint pattern. The selected partial ridge flow map is anticipated to be similar to that of a ridge flow map for a partial latent fingerprint image. However, because the fingerprint patterns associated with the synthetically distorted fingerprint patterns are known when the partial ridge flow maps are selected, the AFIS 100 is able to associate a set of known fingerprint patterns with each of the selected partial ridge flow maps.

The process 300 may include comparing partial ridge flow maps of the dataset to representative ridge flow maps for each fingerprint pattern (330). As described previously with respect to FIG. 2, during the reference ridge flow map generation process, the AFIS 100 selects a set of representative ridge flow maps for each fingerprint pattern from among a set of ridge flow maps for a set of high-quality fingerprint images. The AFIS 100 then aligns two ridge flow maps using methods such as maximization of mutual information, a generalized Hough transformation, identification of core, delta, or distinctive patterns, or use of gradient decent with cost function.

After performing the alignment, the AFIS 100 compares the selected partial ridge flow map against each of the representative ridge flow maps for each fingerprint pattern. As described previously with respect to FIG. 1B, the AFIS 100 computes respective similarity scores between the selected partial ridge flow map and each of the set of representative ridge flow maps that reflect a correspondence between two individual ridge flow maps.

The process 300 may include generating feature vectors for each fingerprint pattern to train classifier (340). For instance, the AFIS 100 may iteratively perform steps 320 and 330 for each of the partial ridge flow maps within the dataset. After completing the iterative comparison process, the AFIS 100 identifies, for each partial ridge flow map, the representative ridge flow maps for each fingerprint pattern that are determined to be most similar to the selected partial ridge flow maps. Thus, because the partial ridge flow maps are randomly selected from among the generated dataset in step 330, the iterative comparison steps performed in steps 340 and 350 allows the AFIS 100 to determine the particular reference ridge flow maps that are most similar to randomly selected partial ridge flow maps for each type of fingerprint pattern.

The AFIS 100 then generates a feature vector for each fingerprint pattern type. Each feature vector specifies, (i) a particular fingerprint pattern or a plurality of fingerprint patterns, (ii) one or more ridge flow maps, and (iii) for each ridge flow map, a set of representative ridge flow maps for the particular fingerprint pattern. In this regard, the feature vectors provide mappings between attributes associated with distortions among latent fingerprints (e.g., the partial ridge flow maps), and attributes associated with a set of high quality fingerprint images. As described more particularly with respect to FIG. 5, these generated feature vectors enable the AFIS 100 to achieve a high degree of accuracy in predicting the fingerprint patterns present within a partial distorted latent fingerprint image.

Automatic Fingerprint Exclusion Processing

The techniques described above enable the AFIS 100 to automatically and accurately classify types of fingerprint patterns (e.g., whorl, left loop, right loop, arch) that are included within a low quality distorted latent fingerprint image (including partial fingerprint images). Such techniques are advantageous because the predicted fingerprint patterns can then be used to reduce the number of fingerprint images to be searched against within a reference database during a fingerprint identification operation in order to identify match candidates. For example, the estimated fingerprint patterns for the latent fingerprint image 160 can be used as an initial filter to exclude those fingerprint images within the reference database that do not include the predicted fingerprint patterns, and compare the latent fingerprint image 160 only against fingerprint images within the reference database that also have at least one of the estimated fingerprint patterns. This automatic fingerprint exclusion processing technique may use a set of respective pattern labels associated with each identified fingerprint pattern to exclude particular reference fingerprint images that do not include predicted fingerprint images within the latent fingerprint image 160.

Figure 4:
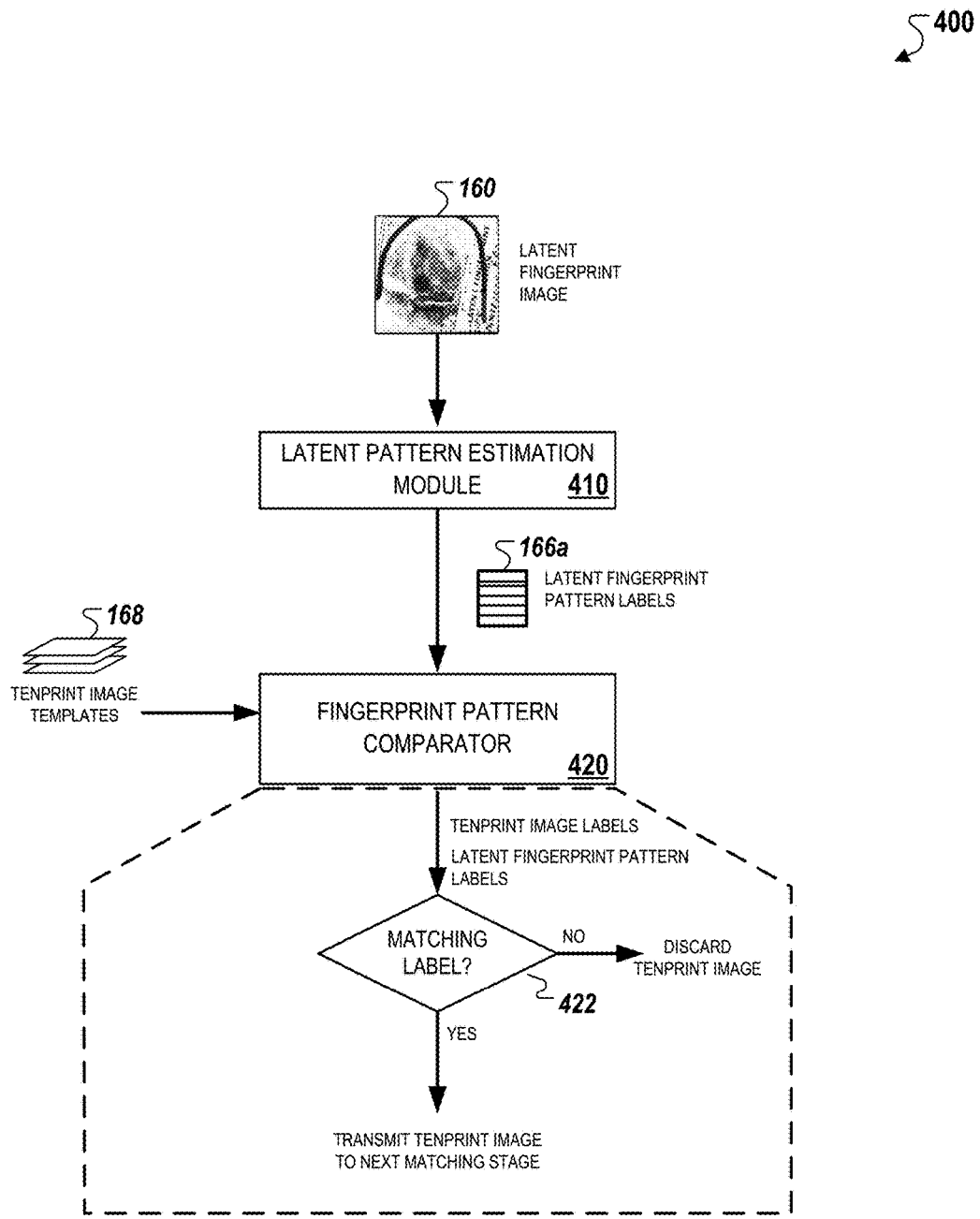
FIG. 4 illustrates an exemplary process for comparing pattern labels between a latent fingerprint image and a set of ten-print image templates.

FIG. 4 illustrates a conceptual diagram for an exemplary system 400 that is capable of using a set of pattern labels to reduce the number of fingerprints to be compared against a latent fingerprint image during a fingerprint identification operation. The system 400 generally includes a pattern simulation module 410 that generates a set of latent fingerprint pattern labels 166 for a latent fingerprint image 160, and a fingerprint pattern comparator 420 that matches the labels 166 against a set of ten-print image templates 168. In some implementations, the system 400 may be a software module and/or component of the AFIS 100 as described herein with respect to FIG. 1.

In more detail, the latent pattern estimation module 410 initially generates a set of labels 166 for an input latent fingerprint image 160. For instance, the latent pattern estimation module 410 performs the process 150, as described herein with respect to FIG. 1B, by generating the latent ridge flow map 162 for the latent fingerprint image, comparing the latent ridge flow map 162 against the set of reference ridge flow maps 164, and identifies the list of predicted fingerprint patterns 166 within the latent fingerprint image 160. Each of the predicted fingerprint patterns 166 is then assigned to a particular pattern label 166a, which operates as a pattern identifier to search against a reference database.

The fingerprint pattern comparator 420 receives the pattern labels 166a estimated by the latent pattern estimation module 410, and also obtains a set of ten-print image templates 168 from a reference database (e.g., the database 150). The set of ten-print image templates 168 are generated offline for a set of ten-print fingerprint images that are stored within the reference database. The set of ten-print image templates may include features extracted from each ten-print image (e.g., minutiae, geometric parameters, alignment parameters, etc.) as well as a set of ten-print image labels that identify the fingerprint patterns that are included within each ten-print image. For example, if a particular ten-print image includes all four fingerprint patterns, then its corresponding ten-print image template includes four ten-print image labels corresponding to the four identified fingerprint patterns.

The fingerprint pattern comparator 420 then compares the received pattern labels 166a of the latent fingerprint image 160 against the ten-print image labels specified by each of the ten-print image templates 168. At step 422, the fingerprint pattern comparator 420 determines if there is at least one matching label between the pattern labels 166a and the ten-print image labels included within each ten-print image template 168.

If the fingerprint pattern comparator 420 is unable identify a match for a particular ten-print image template, then the fingerprint pattern comparator 420 determines that the corresponding ten-print image is unlikely to be a match to the latent fingerprint image 160. The fingerprint pattern comparator 420 thus discards the ten-print image from consideration to a subsequent precision matching phase.

Alternatively, if the fingerprint pattern comparator 420 is able to identify a match of the particular ten-print image template, then the fingerprint pattern comparator 420 determines that there may be a likelihood that the corresponding ten-print image may be a match for the latent fingerprint image 160. In this instance, the corresponding ten-print image is instead transmitted to a subsequent matching phase.

In summary, the process 400 illustrates how estimated fingerprint pattern labels of the latent fingerprint image 160 can be used as a first-stage filter within a matching operation to reduce the number of candidate ten-print images to compare against the latent fingerprint image 160. In this regard, because the presence of fingerprint patterns present within a fingerprint image are rough indicators of distinctive features that are eventually used during a fingerprint matching operation, the estimated fingerprint patterns present within the latent fingerprint image 160 can be used to quickly and efficiently discard reference ten-print images that have dramatically different features and/or attributes. This can be used to potentially reduce the amount of resources necessary to perform a fingerprint matching operation since the disqualification of certain ten-print images reduces the computational burden of comparing the latent fingerprint image 160 against all ten-print images within the reference database in subsequent matching procedures.

Figure 5:
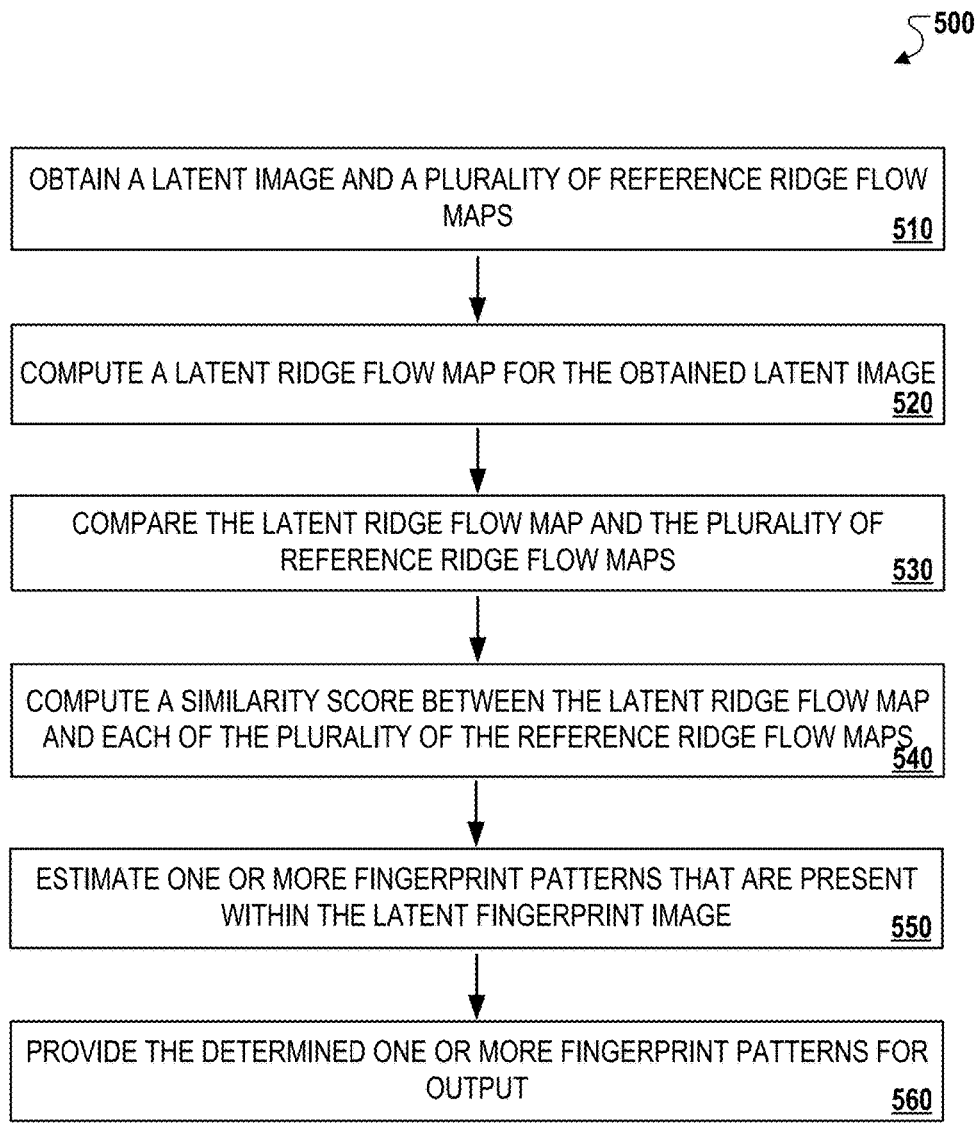
FIG. 5 illustrates an exemplary process for computing fingerprint patterns associated with a latent fingerprint.

FIG. 5 illustrates an exemplary process 500 for computing fingerprint patterns associated with a latent fingerprint. In more detail, the process 500 may include obtaining a latent image and a plurality of reference ridge flow maps (510), computing a latent ridge flow map for the obtained latent image (520), comparing the latent ridge flow map and the plurality of reference ridge flow maps (530), computing a similarity score between the latent ridge flow map and each of the plurality of the reference ridge flow maps (540), estimating one or more fingerprint patterns that are present within the latent fingerprint image (550), and providing the estimated one or more fingerprint patterns for output (560).

In more detail, the process 500 may include obtaining a latent image and a plurality of reference ridge flow maps (510). For instance, as described herein with respect to FIG. 1B, the AFIS 100 may obtain the latent fingerprint 160, and the set of reference ridge flow templates 164 that are each associated with a particular fingerprint pattern (e.g., whorl, left loop, right loop, arch).

The process 500 may include computing a latent ridge flow map for the obtained latent image (520). For instance, the AFIS 100 may compute the latent ridge flow map 162 for the obtained latent fingerprint image 160. As described herein, the latent ridge flow map 162 provides a directional arrangement of friction ridges present within the latent fingerprint image 160. For instance, the latent ridge flow map 162 includes an arrangement of ridge flow vectors that are tangential to the direction of the friction ridges of the latent fingerprint.

The process 500 may include comparing the latent ridge flow map and the plurality of reference ridge flow maps (530). For instance, the AFIS 100 may compare one or more characteristics associated with the latent right flow map 162 to one or more corresponding characteristics associated with each of the plurality of reference ridge flow maps 164. As described herein, the AFIS 100 may measure a correspondence between the latent ridge flow map 162 and each reference ridge flow map from among the set of reference ridge flow maps 164. Such correspondence measurement techniques may include local comparisons of individual ridge flow vectors within particular regions of the latent ridge flow map 162, or global comparisons of sets of ridge flow vectors over the entire area of the latent ridge flow map 162.

The process 500 may include computing a similarity score between the latent ridge flow map and each of the plurality of the reference ridge flow maps (540). For instance, the AFIS 100 may compute, for each of the plurality of reference ridge flow maps 164, a similarity score between the latent ridge flow map 162 and a particular reference ridge flow map based at least on comparing the one or more characteristics associated with the latent ridge flow map 162 to the one or more corresponding characteristics associated with each of the plurality of reference ridge flow maps 164.

The process 500 may include estimating one or more fingerprint patterns that are present within the latent fingerprint image (550). For instance, as described herein, the AFIS 100 may use two exemplary techniques to estimate one or more fingerprint patterns within the latent fingerprint image 160. In some implementations, the AFIS 100 uses the reference ridge flow maps 164 to form a feature vector that specifies one or more features associated with each of the subset of the reference ridge flow maps 164 along with the fingerprint patterns included in each individual ridge flow map. The AFIS 100 then uses a trained classifier, as described herein with respect to FIG. 3, to predict the fingerprint patterns present within the latent fingerprint image 160.

Alternatively, in other implementations, instead of using a feature vector, the AFIS 100 instead identifies the fingerprint classifications associated with the subset of the reference ridge flow maps 164 with computed similarity scores above the predetermined threshold value. The AFIS 100 then aggregates the data for each particular fingerprint pattern by segregating the data by each fingerprint pattern. The AFIS 100 then computes a probability associated with each fingerprint pattern, and assigns corresponding class labels to the latent fingerprint image 160 based on determining which class labels have an associated probability that is greater than a threshold probability.

The process 500 may include providing the estimated one or more fingerprint patterns for output (560). For instance, as described herein with respect to FIG. 4, the estimated fingerprint patterns for the latent fingerprint image 160 can be provided for output to the fingerprint pattern comparator 420 for automatic fingerprint exclusion processing.

Figure 6:
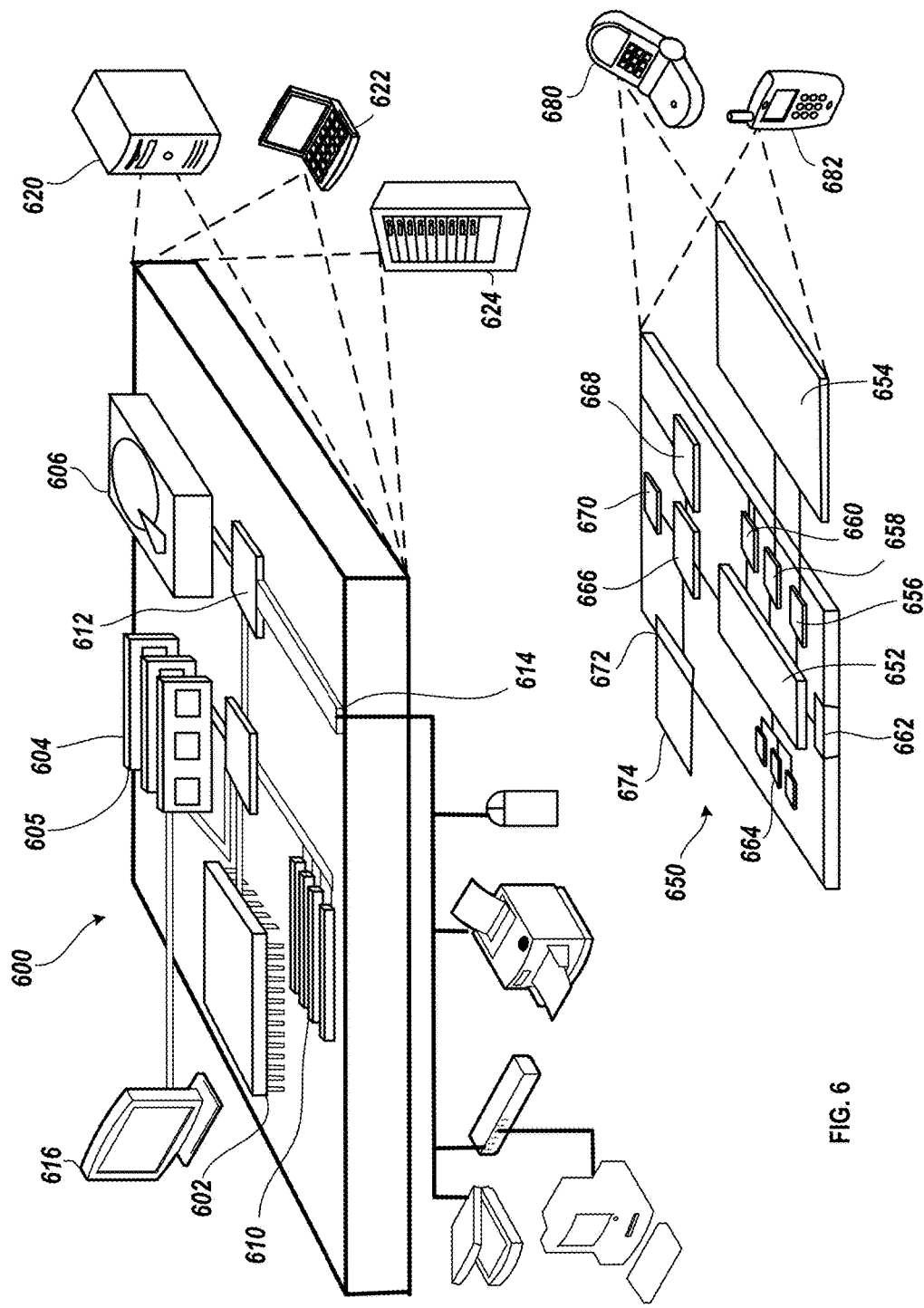
FIG. 6 is a block diagram of computing devices on which the processes described herein, or portions thereof, may be implemented.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices.

Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which may accept various expansion cards (not shown). In the implementation, low-speed controller 612 is coupled to storage device 606 and low-speed expansion port 614. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound, e.g., voice messages, music files, etc. and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for estimating patterns of a latent fingerprint, the method implemented by an automatic fingerprint identification system including a processor, a memory coupled to the processor, an interface to a fingerprint scanning device, and a sensor associated with the fingerprint scanning device, the method comprising:

obtaining (i) a latent fingerprint image, and (ii) a plurality of reference ridge flow maps that are each associated with a particular fingerprint pattern;

computing a latent ridge flow map for the obtained latent fingerprint image;

comparing one or more characteristics associated with the latent ridge flow map to one or more corresponding characteristics associated with each of the plurality of reference ridge flow maps;

computing, for each of the plurality of reference ridge flow maps, a similarity score between the latent ridge flow map and a particular reference ridge flow map based at least on comparing the one or more characteristics associated with the latent ridge flow map to the one or more corresponding characteristics associated with each of the plurality of reference ridge flow maps;

generating a feature vector that includes features associated with the plurality of reference ridge flow maps;

inputting the generated feature vector into a classifier that is trained from a plurality of different feature vectors generated based at least on (i) the plurality of similarity scores computed by matching a plurality of latent ridge flow maps to the reference ridge flow maps, and (ii) a set of manually marked patterns of the plurality of the latent ridge flow maps;

estimating one or more one or more fingerprint patterns present within the latent fingerprint image based at least on features associated with the plurality of reference ridge flow maps that are identified by the classifier; and providing the estimated one or more fingerprint patterns present within the latent fingerprint image for output.

2. The method of claim 1, wherein estimating one or more fingerprint patterns present within the latent fingerprint image comprises:

identifying a subset of the plurality of reference ridge flow maps that each have a respective computed similarity score greater than a predetermined threshold value;

obtaining class labels for each particular fingerprint pattern;

computing respective aggregate probabilities for each of the generated class labels that represent a likelihood that the latent fingerprint image includes the particular fingerprint pattern corresponding to each class label; and estimating one or more one or more fingerprint patterns present within the latent fingerprint image based at least on the computed respective aggregate probabilities for each of the corresponding class labels.

3. The method of claim 2, wherein the predetermined threshold value is empirically determined based on processing one or more addition reference ridge flow maps that are not included within the plurality of reference ridge flow maps.

4. The method of claim 1, wherein obtaining a plurality of reference ridge flow maps comprises:

obtaining a plurality of reference fingerprint images that are each associated with a respective fingerprint pattern, wherein at least some of the plurality of reference fingerprint images are associated with a different respective fingerprint pattern;

computing a reference ridge flow map for each of the plurality of reference fingerprint images;

selecting a set of representative reference ridge flow maps for each respective fingerprint pattern; and storing, as the plurality of reference ridge flow maps, (i) the set of representative ridge flow maps for each respective fingerprint pattern, and (ii) the corresponding respective fingerprint patterns for each representative ridge flow map among the representative ridge flow maps.

5. The method of claim 4, further comprising:

obtaining a plurality of high quality fingerprint images as a plurality of reference fingerprint images, wherein each of the plurality of high quality fingerprint images includes (i) a high ridge contrast, (ii) includes a full fingerprint, and (iii) includes all possible fingerprint patterns; and manually labeling each of the plurality of reference fingerprint images with a particular fingerprint pattern.

6. The method of claim 4, wherein selecting a set of representative reference ridge flow maps for each fingerprint pattern comprises selecting the set of representative reference ridge flow maps using at least one of the following techniques: (i) K-means clustering technique, (ii) agglomerative clustering technique, or (iii) an unsupervised learning technique.

7. The method of claim 1, wherein generating a feature vector comprises:

aligning the latent ridge flow map with each of the plurality of reference maps;

comparing each block of the aligned maps between the latent ridge flow map and each of reference maps;

calculating the similarity scores for each latent ridge flow map to the plurality of reference maps; and generating the feature vector based on the similarity scores of the latent ridge flow map to the plurality of reference maps.

8. The method of claim 7, wherein aligning the latent ridge flow map with each of the plurality of reference ridge flow maps comprises using at least one of the following techniques:

a maximization of mutual information technique;
   a generalized Hough transformation technique;
   use of core, delta or distinctive pattern-based technique; or
   a gradient decent method with a cost function technique.

9. The method of claim 7, wherein the feature vector is obtained by dimensional reduction using a principal component analysis technique.

10. A method of claim 1, wherein the plurality of latent ridge maps is generated from a set of simulated latent images.

11. The method of claim 10, wherein the plurality of latent ridge flow maps are generated from the set of simulated latent images using a derivation technique from a plurality of real fingerprint images with different image qualities, the derivation technique comprising:
   extracting the ridge flow map from each of the plurality of real fingerprint images with different image qualities;
   randomly selecting one or more partial ridge flow maps from among the extracted ridge flow maps from each of the plurality of real fingerprint images with different image qualities; and
   manually assigning a plurality of fingerprint patterns consisting of a whorl, a left loop, a right loop, an arch, or combination thereof, to each of the randomly selected one or more partial ridge flow map of the fingerprint image.

12. The method of claim 1, wherein the classifier comprises at least one of the following:
   a Random Forest classifier;
   a support vector machine;
   a neural network; or
   a traditional pattern classifier.

13. The method of claim 1, further comprising:
   after determining the one or more fingerprint patterns present within the latent fingerprint image, obtaining a pre-enrolled reference dataset comprising a plurality of ten-print images, each ten-print image associated with a particular fingerprint pattern;
   comparing the one or more fingerprint patterns present within the latent fingerprint image to the fingerprint patterns associated with each of the ten-print images;
   identifying a subset of the plurality of ten-print images that are associated with fingerprint patterns that are not included within the one or more fingerprint patterns present within the latent fingerprint image; and
   excluding the subset of the plurality of ten-print images from a subsequent pre-enrolled reference dataset used to compare against the latent fingerprint image for a fingerprint matching operation.

14. A system comprising:
   a fingerprint scanning device, including (i) an interface to a fingerprint scanner, and (ii) a sensor associated with the fingerprint scanner, configured to identify a match between a search record representing a fingerprint of a subject and a reference record from among a plurality of reference records representing fingerprints of a plurality of historical subjects;
   a database containing the plurality of reference records representing fingerprints of the plurality of historical subjects; and
   a computing device in communication with said database and said fingerprint scanning device, said computing device having a processor and a memory coupled to said processor, said computing device configured perform operations comprising:
      obtaining (i) a latent fingerprint image, and (ii) a plurality of reference ridge flow maps that are each associated with a particular fingerprint pattern;
      computing a latent ridge flow map for the obtained latent fingerprint image;
      comparing one or more characteristics associated with the latent ridge flow map to one or more corresponding characteristics associated with each of the plurality of reference ridge flow maps;
      computing, for each of the plurality of reference ridge flow maps, a similarity score between the latent ridge flow map and a particular reference ridge flow map based at least on comparing the one or more characteristics associated with the latent ridge flow map to the one or more corresponding characteristics associated with each of the plurality of reference ridge flow maps;
      generating a feature vector that includes features associated with the plurality of reference ridge flow maps;
      inputting the generated feature vector into a classifier that is trained from a plurality of different feature vectors generated based at least on (i) the plurality of similarity scores computed by matching a plurality of latent ridge flow maps to the reference ridge flow maps, and (ii) a set of manually marked patterns of the plurality of the latent ridge flow maps;
      estimating one or more one or more fingerprint patterns present within the latent fingerprint image based at least on features associated with the plurality of reference ridge flow maps that are identified by the classifier; and
      providing the estimated one or more fingerprint patterns present within the latent fingerprint image for output.

15. The system of claim 14, wherein estimating one or more fingerprint patterns present within the latent fingerprint image comprises:
   identifying a subset of the plurality of reference ridge flow maps that each have a respective computed similarity score greater than a predetermined threshold value;
   obtaining class labels for each particular fingerprint pattern;
   computing respective aggregate probabilities for each of the generated class labels that represent a likelihood that the latent fingerprint image includes the particular fingerprint pattern corresponding to each class label; and
   estimating one or more one or more fingerprint patterns present within the latent fingerprint image based at least on the computed respective aggregate probabilities for each of the corresponding class labels.

16. The system of claim 15, wherein the predetermined threshold value is empirically determined based on processing one or more addition reference ridge flow maps that are not included within the plurality of reference ridge flow maps.

17. The system of claim 14, wherein obtaining a plurality of reference ridge flow maps comprises:
   obtaining a plurality of reference fingerprint images that are each associated with a respective fingerprint pattern, wherein at least some of the plurality of reference fingerprint images are associated with a different respective fingerprint pattern;
   computing a reference ridge flow map for each of the plurality of reference fingerprint images;
   selecting a set of representative reference ridge flow maps for each respective fingerprint pattern; and
   storing, as the plurality of reference ridge flow maps, (i) the set of representative ridge flow maps for each respective fingerprint pattern, and (ii) the corresponding respective fingerprint patterns for each representative ridge flow map among the representative ridge flow maps.

\* \* \* \* \*